O. PEARSON.
VALVE FOR ENGINES.
APPLICATION FILED DEC. 10, 1908.
942,587.
Patented Dec. 7, 1909.
2 SHEETS—SHEET 1.
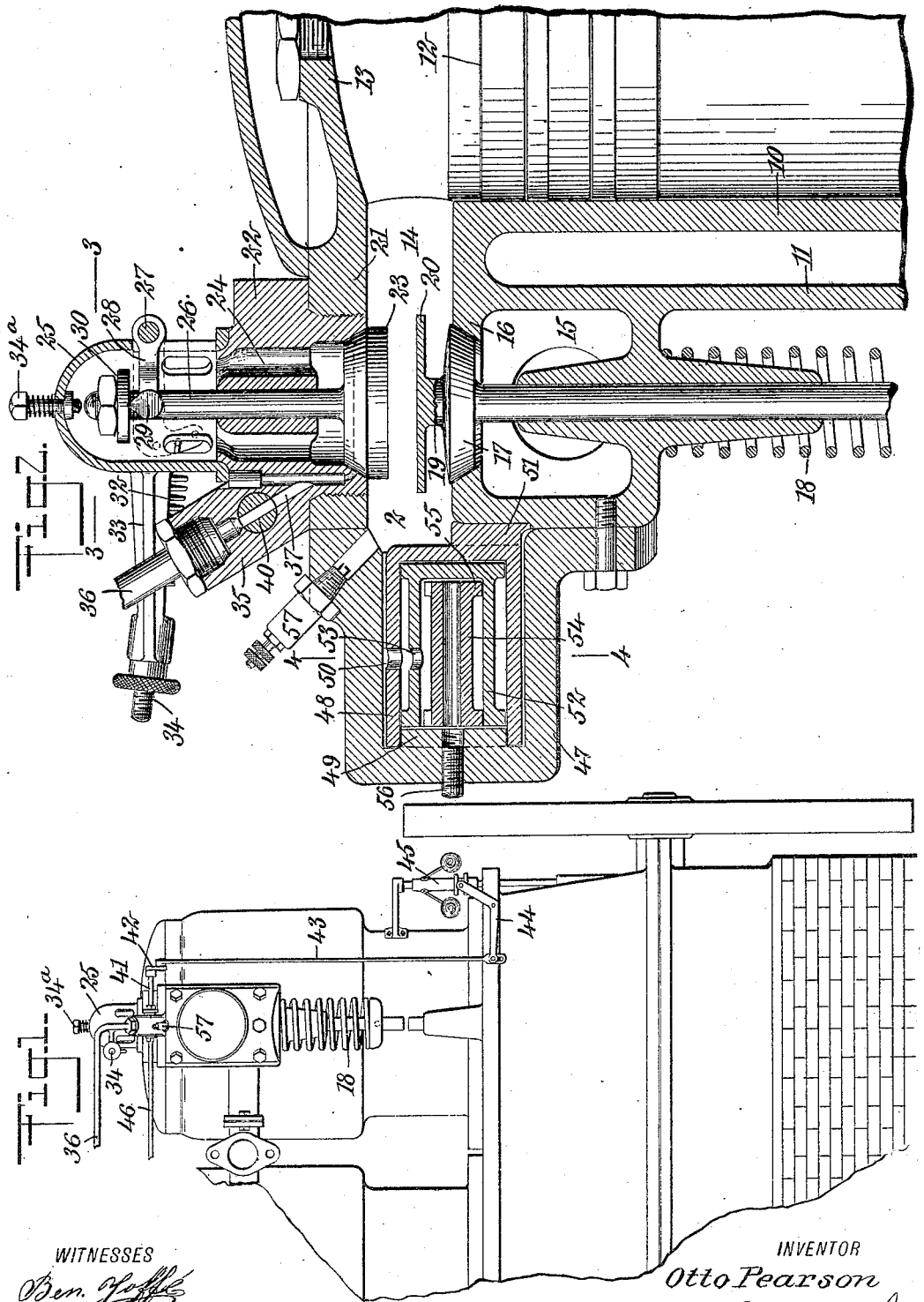
WITNESSES
Ben. Joffe
C. W. Fairbank
INVENTOR
Otto Pearson
BY Munn & Co.
ATTORNEYS O. PEARSON.
VALVE FOR ENGINES.
APPLICATION FILED DEC. 10, 1908.
942,587.
Patented Dec. 7, 1909.
2 SHEETS—SHEET 2.
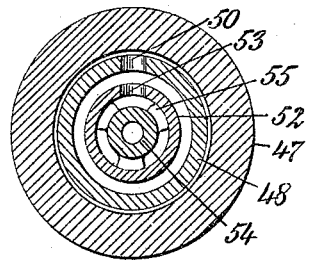
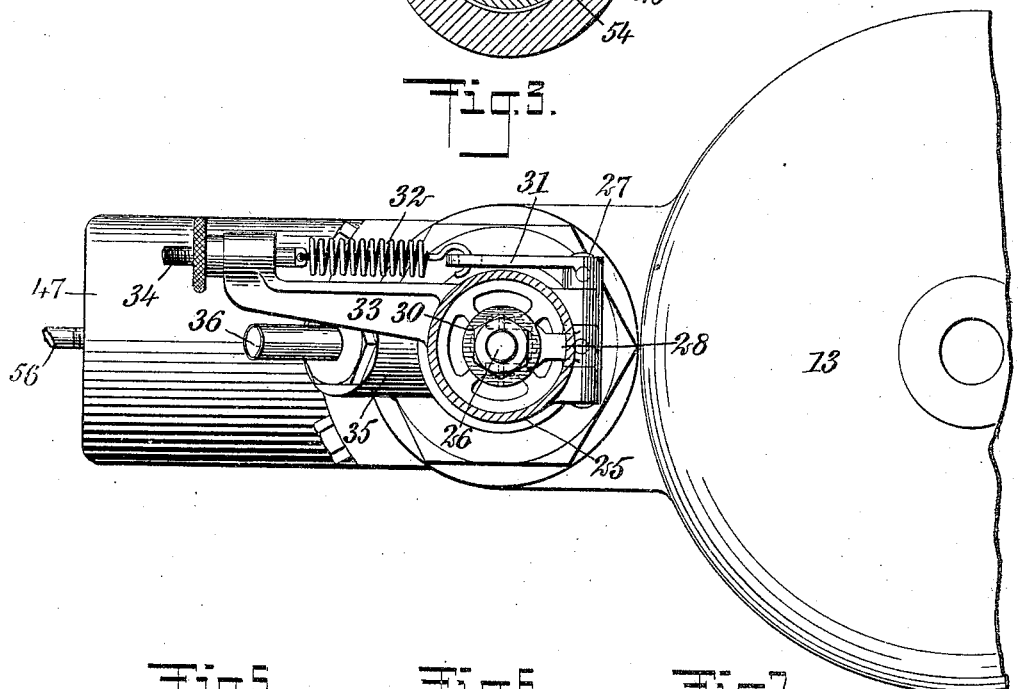
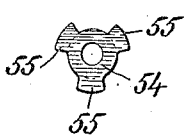
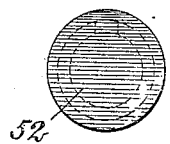
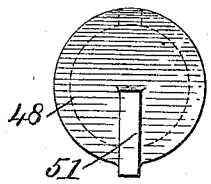
WITNESSES
Ben. Joffé
C. W. Fairbanks
INVENTOR
Otto Pearson
BY Munn & Co.
ATTORNEYS

UNITED STATES PATENT OFFICE.

OTTO PEARSON, OF WORCESTER, MASSACHUSETTS.

VALVE FOR ENGINES.

942,587.

Specification of Letters Patent. Patented Dec. 7, 1909.

Application filed December 10, 1908. Serial No. 466,784.

*To all whom it may concern:*

Be it known that I, OTTO PEARSON, a citizen of the United States, and a resident of Worcester, in the county of Worcester and State of Massachusetts, have invented a new and Improved Valve for Engines, of which the following is a full, clear, and exact description.

This invention relates to certain improvements in engines and more particularly to a type of inlet valve especially designed for use on an internal combustion engine.

In my improved valve construction the valve stem is mounted in a valve cage having openings for the admission of the gas, and entirely outside of this valve cage is mounted the spring for normally maintaining the valve in its closed position. A rock shaft is mounted on the wall of the valve cage and one arm from this rock shaft engages the valve stem and the other arm is operatively connected to the spring. The spring, rock shaft and other supports are entirely outside of the valve cage and out of the path of the incoming air or gas.

Reference is to be had to the accompanying drawings, forming a part of this specification, in which similar characters of reference indicate corresponding parts in all the figures, and in which—

Figure 1 is a side view of a portion of an engine constructed in accordance with my invention; Fig. 2 is an enlarged section through the inlet exhaust and igniting means; Fig. 3 is a top plan view of the parts shown in Fig. 2, a portion thereof being shown in section on the line 3—3 of said figure; Fig. 4 is a transverse section through the igniter and taken on the line 4—4 of Fig. 2; and Figs. 5, 6 and 7 are end views of the concentric cylinders going to make up my improved igniter.

In the specific construction illustrated in the accompanying drawings, I employ an engine cylinder 10 of any suitable construction, preferably having a water jacket 11 for cooling the same and within the cylinder is the customary piston 12. Adjacent the cylinder head 13 the casing forming the cylinder and jacket is provided with an offset forming a chamber or recess 14, within which the gases are compressed by the upward stroke of the piston and through which the fresh charges are admitted and the exhaust charges permitted to escape.
Below the compression chamber 14 is an exhaust chamber 15 separated from the former by a wall 16 having a valve seat. The exhaust valve 17 fits upon this seat and is adapted to open inwardly to permit the escape of gas from the cylinder through the chamber 15 to the exhaust conduit. The exhaust valve is normally held closed by a spring 18 and is opened mechanically against the action of the spring in any suitable manner. The exhaust valve 17 operates in substantially the same manner as the ordinary exhaust valve, but in addition thereto it also operates as a vaporizer for the liquid fuel. At the inner surface of the valve proper is an inwardly-extending stud 19 supporting a plate 20 of slightly greater diameter than the valve proper but held in a horizontal plane and substantially parallel to the plane of the valve. This plate is heated by the rush of hot exhaust gas past the same upon the opening of the exhaust valve, and while in the highly heated condition it receives the liquid fuel and rapidly vaporizes the latter. Threaded into the upper wall 21 of the chamber 14 is a valve casing 22 having a valve seat at its inner end for the inlet valve 23. The valve casing is provided with a plurality of passages 24 therethrough, and at its outer end there is provided a perforated frame or dome 25 through which the outside air may enter to the passages 24 and thus to the inlet valve. Instead of placing a coil spring about the valve stem 26 of the inlet valve 23 to normally hold the latter in its closed position, I provide certain lever mechanism whereby a spring of a more advantageous form may be employed and better results secured.

Journaled in the side of the frame or dome 25, I provide a rock shaft 27 having an inwardly-directed arm 28 terminating in a yoke disposed upon opposite sides of the valve stem 26. At the ends of the yoke arms are heads 29, each terminating at its upper surface in a knife edge disposed beneath a collar or washer 30 carried by the valve stem. At one end of the rock shaft is an outwardly-extending arm 31 outside of the dome or casing, and to the end of this arm is secured one end of a coil spring 32. The opposite end of the spring is secured to any stationary member, as, for instance, a bracket 33 formed integral with the frame or dome 25. A suitable adjusting screw 34 may be provided for connecting the spring to the bracket, so as to vary the tension of the spring at will. The arm 31 is of greater length than the arm 28, so that the spring 32 will be elongated to an extent greater than the distance of movement of the valve. Thus, a much finer adjustment of the spring may be obtained and the valve permitted to open with exactly the desired degree of suction pressure. For positively opening the valve in case it should stick, the casing 25 may carry a spring-pressed pin 34ª substantially in alinement with the valve stem.

For admitting the liquid fuel to the engine, the valve casing 22 is formed with a boss or branch 35 to which the outer end of a fuel pipe 36 may be connected. A passage 37 leads through the boss or branch 35 and terminates in the side of the valve seat at the inner end of the casing. The valve when upon its seat not only prevents the admission of air to the interior of the cylinder but also closes the end of said passage and prevents the admission of any liquid fuel. The inlet valve 23 is of smaller diameter than the plate 20 carried by the exhaust valve, so that as the inlet valve opens, the liquid fuel may enter and drop upon the plate 20 to be vaporized and carried along into the cylinder with the incoming air. Within the boss or branch 35 there is provided a valve 40 for controlling the passage 37, and this valve is preferably operated by a governor, so that the quantity of liquid fuel may be varied by variations in the speed of the engine. The valve is preferably of the "turn plug" type and at one end of the valve stem 41 is a crank arm 42 connected by a link 43 and bell crank lever 44 to any suitable form of governor 45. A variation in the speed of the engine serves to rotate the valve 40 and increase or diminish the amount of liquid admitted.

There is preferably provided a slight amount of lost motion in the connections between the link 43 and the bell crank lever 44, so that the valve may be positively operated in starting the engine and independently of the governor. Preferably, the valve is provided with a second valve stem 46 extending outwardly therefrom in the opposite direction and adapted to be manually controlled to control the valve.

As above explained, I utilize the heat of exhaust gas to vaporize the incoming fuel, but in addition to this I also utilize the same heat for igniting the fresh charge. To accomplish this, one end of the recess or chamber 14 is closed by a hollow cylindrical casing 47, within which are mounted a series of concentric cylinders of heat refractory material. One of these cylinders 48 is slightly smaller than the interior of the casing 47 and is held out of engagement therewith by a central stud or boss 49 on the inner surface of the outer end of the casing. The cylinder 48 is provided with an aperture 50 therethrough and its end toward the recess 14 is closed and provided with a lug 51 for engagement with the wall of the valve casing, to hold the cylinder 48 against movement. Within the cylinder 48 is a second cylinder 52 having annular flanges at each end for holding the body of the cylinder out of engagement with the outer cylinder, and intermediate the ends of the cylinder is provided an aperture 53 substantially in alinement with the aperture 50. Inside of the cylinder 52 is a third cylinder 54 spaced therefrom by lugs 55 adjacent the ends. The interior of the inner cylinder may communicate with a pipe 56 leading through the end of the casing 47 and through which air may be admitted or permitted to escape.

In starting my improved engine, it is, of course, evident that the cylinders 48, 52 and 54 will be cold and an outside heating or igniting agent will need to be employed. For this purpose I may apply heat directly to the exterior of the valve casing 47, direct a flame through the pipe 56, or utilize a separate igniter, as, for instance, a spark plug 57. After the engine has started, the hot gases of combustion will come in contact with the extensive surface of the three concentric cylinders and the latter will become heated to a very high temperature. As soon as the new charge is admitted and compressed by the upward movement of the piston, the heat within the refractory cylinders will cause the ignition of the fresh charge and the spark plug or igniting means within the cylinders need no longer be employed.

Having thus described my invention, I claim as new and desire to secure by Letters Patent:

1. In combination, a puppet valve having a valve stem, a valve cage, means within the valve cage for guiding said stem, a rock shaft mounted upon the wall of said cage and having an arm extending into the cage and an arm extending exteriorly of the cage, and a coil spring outside of said cage and having one end secured to a fixed point and having the opposite end secured to the last-mentioned arm.

2. In combination, a puppet valve having a valve stem, a valve cage having inlet openings and means for guiding the valve stem, a bracket upon the exterior of said cage, a rock shaft journaled upon the wall of said cage and having an arm extending into the cage and engaging with the valve stem, and having a second arm extending exteriorly of the valve cage, a spring having one end secured to said last-mentioned arm, and means for adjustably connecting the opposite end of the spring to said bracket adjacent the outer end of the latter.

In testimony whereof I have signed my name to this specification in the presence of two subscribing witnesses.

OTTO PEARSON.

Witnesses:
   OTTO E. ANDERSON,
   AUGUST SELEN.